US007823895B2

(12) United States Patent
Wagne

(10) Patent No.: US 7,823,895 B2
(45) Date of Patent: Nov. 2, 2010

(54) SUSPENSION SYSTEM, VEHICLE COMPRISING SUCH A SUSPENSION SYSTEM AND A METHOD FOR CONTROLLING A SUSPENSION SYSTEM

(75) Inventor: Olov Wagne, Linköping (SE)

(73) Assignee: Stromsholmen AB, Tranas (SE)

( * ) Notice: Subject to any disclaimer, the term of this patent is extended or adjusted under 35 U.S.C. 154(b) by 208 days.

(21) Appl. No.: 12/272,172

(22) Filed: Nov. 17, 2008

(65) Prior Publication Data

US 2009/0134588 A1    May 28, 2009

Related U.S. Application Data

(60) Provisional application No. 61/004,238, filed on Nov. 26, 2007.

(30) Foreign Application Priority Data

Nov. 23, 2007    (SE)    ................. 0702600-8

(51) Int. Cl.
*B60G 9/04*    (2006.01)
(52) U.S. Cl. .......................................... 280/124.157
(58) Field of Classification Search .......... 280/6.157, 280/124.157, 124.158, 124.159, 124.16
See application file for complete search history.

(56) References Cited

U.S. PATENT DOCUMENTS 5,217,247 A * 6/1993 Nezu et al. ............... 280/5.501
5,547,211 A * 8/1996 Runkel .................... 280/6.159
5,586,781 A   12/1996 Anderson
6,264,212 B1 * 7/2001 Timoney .................. 280/5.51

FOREIGN PATENT DOCUMENTS

| DE | 1129845 | 5/1962 |
|---|---|---|
| DE | 1580236 | 1/1970 |
| DE | 3442497 A1 | 5/1986 |
| DE | 3934385 A1 | 4/1991 |
| EP | 0197316 | 4/1992 |
| EP | 0666803 | 7/1998 |
| EP | 1314586 | 5/2003 |
| EP | 0985099 | 6/2003 |
| EP | 1094959 | 4/2004 |
| EP | 1577580 | 2/2005 |
| EP | 1559596 | 8/2005 |
| GB | 1194276 | 6/1970 |
| GB | 1311646 | 3/1973 |
| GB | 1602291 | 11/1981 |
| GB | 2171488 A | 8/1986 |
| JP | 4-90917 | 3/1992 |
| WO | WO 00/02743 | 1/2000 |

* cited by examiner

*Primary Examiner*—Paul N Dickson
*Assistant Examiner*—Robert A Coker
(74) *Attorney, Agent, or Firm*—Fay Sharpe LLP; Brian E. Turung

(57) ABSTRACT

A suspension system for a vehicle (3) comprises a gas spring accumulator (6) pneumatically connected (7) to a system accumulator (8). The suspension system further comprises a gas throttle valve (9) arranged to restrict the pneumatic connection (7) between the gas spring accumulator (6) and the system accumulator (8), such that only a limited mass flow which is greater than zero is allowed in the pneumatic connection (7).

28 Claims, 2 Drawing Sheets

SUSPENSION SYSTEM, VEHICLE COMPRISING SUCH A SUSPENSION SYSTEM AND A METHOD FOR CONTROLLING A SUSPENSION SYSTEM

The present invention claims priority on U.S. Provisional Application Ser. No. 61/004,238 filed Nov. 26, 2007 and Swedish Patent Application Serial No. 0702600-8 filed Nov. 23, 2007, both of which are fully incorporated herein by reference.

TECHNICAL FIELD

The present document relates to a suspension system for a vehicle, a vehicle comprising such a suspension system, and a method for controlling a suspension system.

More specifically, the present document relates to a hydropneumatic suspension system, which is especially suitable for heavy-duty vehicles, such as lorries, buses, crawler-type vehicles or other cross-country vehicles.

BACKGROUND OF THE INVENTION

Many vehicles nowadays have some form of suspension system. A complete suspension system usually comprises both a spring and a damper. The spring often comprises a steel helical spring and inside the spring sits a damper. The total force in the spring leg is given by the sum of the force from the spring and the force from the damper. The spring force is determined by the position of the spring leg and the damping force is given by the speed of the spring leg. This principle is currently applied to most types of wheeled vehicles, such as passenger cars and heavy-duty vehicles.

For heavy-duty vehicles, the development has resulted in a gas-hydraulic (hydropneumatic) suspension, which is used in certain cases. This solution has meant, for instance, increased comfort, better driving characteristics, less vibrations, reduced effect upon the chassis, and increased productivity, especially when the vehicle has been heavily loaded.

For a vehicle spring, the natural frequency ω of the vehicle according to equation 1 below is:

$$\omega = \sqrt{\frac{k}{m}}$$

where m is the mass of the vehicle and k is the spring constant. A desired natural frequency for a vehicle is usually about 1 Hz. For heavy-duty vehicles which take a large load, the gross weight of the vehicle can vary by a relatively large amount, thus affecting the natural frequency of the vehicle. Under heavy loads, the natural frequency of the vehicle reduces, and under lighter loads it increases. This has the effect that the dynamic behavior of the vehicle is changed when the load is changed. The comfort of the driver and the drivability of the vehicle will therefore depend on the extent to which the vehicle is loaded. Usually the spring constant is tailored to a normal-loaded vehicle, but this is a disadvantage, since the dynamic characteristics of the vehicle are not optimal under all conditions. If the axle load of the vehicle is changed from 40% to 160% of the normal case, which is not unusual for heavy goods vehicles, this means that the natural frequency is doubled from the heaviest to the lightest case. It is therefore desirable in these cases to be able to change the spring constant so as to keep the natural frequency constant and maintain the driving characteristics.

With the aid of gas spring technology, the spring and the damper can be arranged such that the movements of the wheel are transmitted to the gas spring accumulator via hydraulic fluid which flows through two valves. The force in the spring leg will then be determined firstly by the position of the leg, which gives the pressure in the spring accumulator and thus the spring force, and secondly the speed of the leg, which gives the flow resistance through the valves and thus the damping force.

The spring constant can now be changed by adjusting the pressure in the gas spring accumulator via a gas valve. The weight of the vehicle gives the gas pressure in the gas spring accumulator and the quantity of gas gives the volume of the gas cushion, and thus the pressure build-up and spring constant of the gas spring accumulator. The volume of the gas cushion also gives the neutral position of the gas spring accumulator and thus the ride height of the vehicle, which is measured with the aid of a position transducer. Through the replenishment and drawing-off of gas from the gas spring accumulator, the ride height of the vehicle can therefore also be adjusted in dependence on terrain and load. The pressure in the gas spring accumulator is measured via a pressure transducer.

With the aid of known relationships (the universal gas law), the pressure build-up of the gas spring accumulator (and thus spring constant) for different vehicle weights can be obtained. It is then found that if the volume of the gas cushion, and thus the neutral position of the vehicle, is kept constant for different vehicle weights, the spring constant will be changed in such a way that the natural frequency of the vehicle is kept constant. Through the use of gas spring technology, it is thus possible to overcome the problems described in the background of the invention.

The replenishment and drawing-off of gas to/from the gas spring accumulator is realized with the aid of a so-called system accumulator, which sits positioned in a suitable location in the vehicle. The gas side of the system accumulator can be connected to the gas spring accumulator on one or more spring legs. The oil side of the system accumulator can be connected to the hydraulic system of the vehicle. By adjusting the pressure in the hydraulic system of the vehicle, different gas pressures in the system accumulator can be obtained.

The obtained gas pressure is then used to adjust the gas pressure in the gas spring accumulator in dependence on the vehicle load. In this way, the gas quantity in the gas spring accumulator, and thus the ride height of the vehicle, is regulated. Entrapment of the gas between the gas spring accumulator and the system accumulator means that the gas system is closed, which allows work at high gas pressures (for example 150-350 bar), this being an advantage in heavy applications. During the replenishment and drawing-off of gas to/from the spring leg, the gas valve must be open and, during driving of the vehicle, it must be shut.

A controlled gas valve calls for a more complicated control system, however, and also constitutes a risk site for possible gas leakage.

GB 1 602 291 shows a hydropneumatic suspension system which comprises a power cylinder which, by means of hydraulic fluid, communicates via a pipeline with a first chamber in which hydraulic fluid and gas are separated by a membrane. The gas side in the first chamber communicates, via a pipeline provided with a two-position valve, with a second chamber, in which hydraulic fluid and gas is separated by a membrane. The second chamber is connected to a control valve, which can selectively connect the fluid part of the second chamber with a pump, a re-adjustable or a rest position. Height adjustment of the vehicle is realized by the control valve being connected to the readjustableir or the pump, whereupon the fluid pressure, and therefore also the gas pressure, in the second chamber is changed and, via the pipeline and the two-position valve, affects the gas pressure in the first chamber.

DE 39 34 385 A1 shows a hydropneumatic suspension system comprising a pair of fixed, concentrically arranged inner and outer cylinders, between which an annular chamber is present. An annular piston, connected to a third cylinder, is displaceable in the annular chamber. In the inner cylinder there is a floating piston, which divides the inner cylinder into two inner spaces. One of these inner spaces is gas-filled and connected to an external accumulator for level control. The two sides of the annular piston are connected to each other via an external line for hydraulic fluid having an adjustable damper valve, to an external accumulator and to the second of the inner spaces. Height adjustment is therefore achieved hydraulically. Pressure adjustment of the gas spring part is possible.

EP 0 666 803 B1 shows a system for variable vehicle height, in which chambers for hydraulic and pneumatic fluid are disposed in a common cylinder, which in turn is formed by a pair of telescopically arranged cylinders with a floating piston arranged therebetween. The chamber for pneumatic piston is connected to an accumulator chamber via controllable shut-off valves comprising first and second check valves and first and second adjustable valves. A microprocessor is arranged to control the adjustable shut-off valves, so that pneumatic fluid can selectively be led between the accumulator chamber and the chamber for pneumatic fluid to allow height adjustment of the vehicle.

EP 1 577 580 A2 shows a hydropneumatic suspension element having first and second oil-containing cylinders, which are connected by a coupling element so that oil can pass between the cylinders. A third cylinder, which is provided with a valve for replenishment/drawing-off of oil, is arranged telescopically in the first cylinder, so that the oil volume in the system is variable by a telescopic movement between the first and third cylinders. The second cylinder comprises a separating piston, which separates the oil from a gas chamber. The gas chamber is provided with a valve for the replenishment drawing-off of gas. The gas chamber therefore acts as a gas spring with regard to relative movements between the third cylinder and the first cylinder. A fixed hydraulic damper part is disposed in the first cylinder.

There is a need for an improved and/or simplified suspension system of the type discussed above.

SUMMARY OF THE INVENTION

The present invention relates to a suspension system for a vehicle, a vehicle comprising such a suspension system, and a method for controlling a suspension system. In particular, the present invention relates to a hydropneumatic suspension system which is especially suitable for heavy-duty vehicles such as, but not limited to, lorries, buses, crawler-type vehicles or other cross-country vehicles; however, it will be appreciated that the suspension system of the present invention can be used for other types of vehicle.

According to one non-limit aspect of the invention, there is provided a suspension system for a vehicle is that includes a gas spring accumulator which is in pneumatic connection with a system accumulator. The suspension system comprises a gas throttle valve that is arranged to restrict the pneumatic connection between the gas spring accumulator and the system accumulator such that only a limited mass flow that is greater than zero is allowed in the pneumatic connection.

As defined herein, "gas spring accumulator" is that part which produces the spring action at the respective action point (for example each individual wheel).

As defined herein, "gas throttle valve" is a valve which is designed to only partially restrict a gas flow in a gas line.

By use of the suspension system of the present invention, the suspension system will react to rapid wheel movements such that the pressure difference between the spring leg and the system accumulator will vary from + to − and only a small quantity of gas manages to flow over between the pulsations. The mean pressure will be the same or substantially the same in both the spring leg and the system accumulator. When the vehicle height is adjusted, a more prolonged pressure difference is obtained and a larger quantity of gas flows over, until the mean pressure in the gas spring accumulator is the same or substantially the same as the pressure in the system accumulator. A precondition of the proper operation of the suspension system is that the pressure in the system accumulator is kept constant. The gas throttling also means that any temperature variations during summer and winter can be compensated in a simple manner.

The suspension system of the present invention can further comprise a power transmission part, designed to act between a sprung part and an unsprung part of the vehicle; however, this is not required. The gas spring accumulator can be connected to the power transmission part; however, this is not required.

The power transmission part can comprise a piston interacting with a hydraulic fluid, however, this is not required.

The gas spring accumulator can be hydraulically connected to the power transmission part via at least one hydraulic duct; however, this is not required. According to one non-limiting embodiment of the invention, the hydraulic duct can be provided with a throttle valve. According to another and/or alternative non-limiting embodiment of the invention, the hydraulic duct can be provided with a check valve.

The gas spring accumulator can be hydraulically connected to the power transmission part via at least two hydraulic ducts; however, this is not required. According to one non-limiting embodiment of the invention, at least two hydraulic ducts can be provided with a respective throttle valve. According to another and/or alternative non-limiting embodiment of the invention, at least two hydraulic ducts can be provided with a respective check valve.

More than two hydraulic ducts may also be present and can then be selectively provided with throttle valves and/or check valves, however, this is not required.

The gas throttle valve can be a fixed valve, which can be arranged to allow a predetermined flow which is greater than zero; however, this is not required. A very simple suspension system can be achieved in accordance with the present invention.

The gas throttle valve can be an adjustable valve which can be arranged to allow at least two different flows which both are greater than zero; however, this is not required. A flexible system suspension system can be achieved in accordance with the present invention.

The gas throttle valve can have an effective valve area which is less than the area of the pneumatic connection; however, this is not required.

The system accumulator can be designed to interact with a hydraulic system of the vehicle such that a pressure in the system accumulator is at least partially controllable with the aid of the hydraulic system; however, this is not required.

Alternatively or as a complement, the system accumulator can be connected to a compressor such that a pressure in the system accumulator can be at least partially controllable with the aid of the compressor; however, this is not required.

According to another and/or alternative non-limiting aspect of the invention, a vehicle comprising a suspension system according to the above is provided.

According to still another and/or alternative non-limiting aspect of the invention, a method is provided for controlling a suspension system for a vehicle, which suspension system comprises a gas spring accumulator which is pneumatically connected to a system accumulator. The method comprises restricting the pneumatic connection between the gas spring accumulator and the system accumulator, such that only a limited mass flow which is greater than zero is allowed.

The method can comprise the achievement of an essentially constant pressure in the system accumulator; however, this is not required.

The method can also comprise changing a spring constant of the gas spring accumulator by changing the pressure in the system accumulator and maintaining the restriction of the pneumatic connection; however, this is not required.

The method can also comprise controlling a fluid flow between the gas spring accumulator and a power transmission part; however, this is not required.

One non-limiting object of the present invention is to provide an improved or alternative suspension system.

Another and/or alternative non-limiting objects of the present invention if to provide a suspension system which offers preconditions for the level control of the vehicle, providing a suspension system which allows adjustment of the spring constant of the suspension system, providing a suspension system which is easy to control, providing a suspension system which is applicable to heavy-duty vehicles, and/or providing a suspension system which offers the facility to compensate for temperature variations.

These and other objects of the present invention will become readily apparent upon further review of the following specification and drawings.

BRIEF DESCRIPTION OF THE DRAWINGS

Reference may now be made to the drawings which illustrate various preferred embodiments that the invention may take in physical form and in certain parts and arrangement of parts wherein.

DESCRIPTION OF EMBODIMENTS

Figure 1:
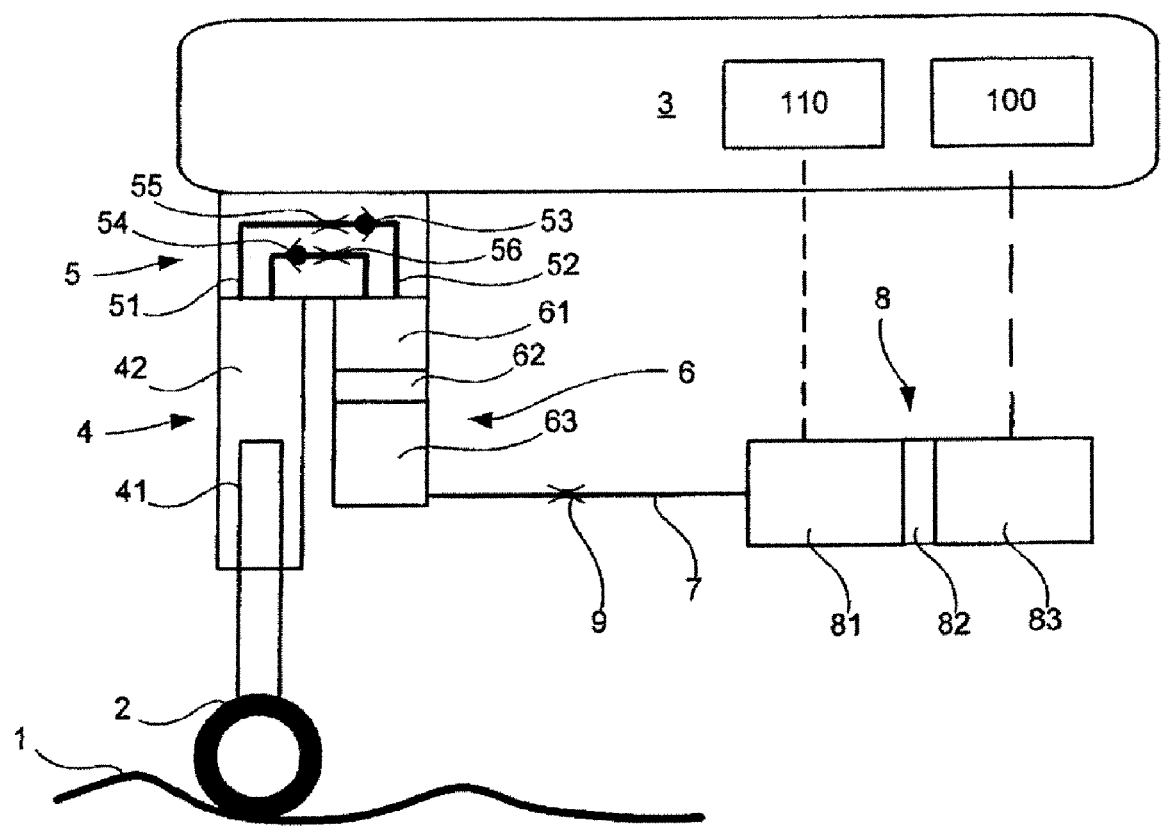
FIG. 1 shows a schematic basic diagram of a suspension system.
Figure 2:
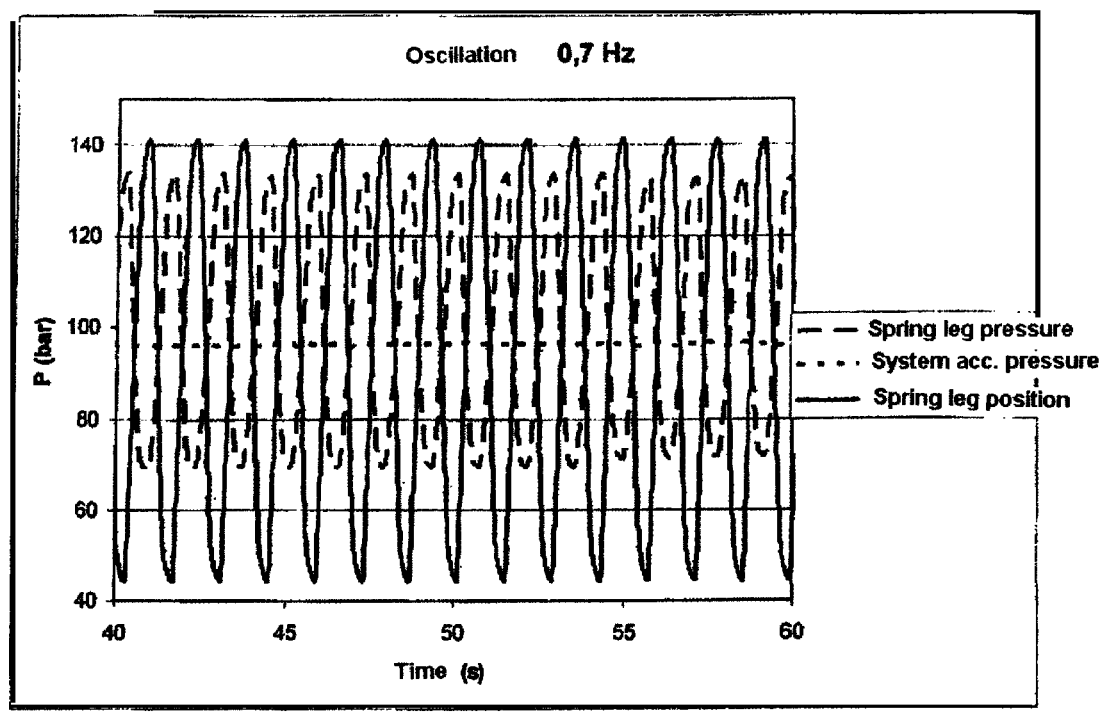
FIG. 2 shows a first test result of the suspension system in FIG. 1; and, FIG. 3 shows a second test result of the suspension system in FIG. 1.
Figure 3:
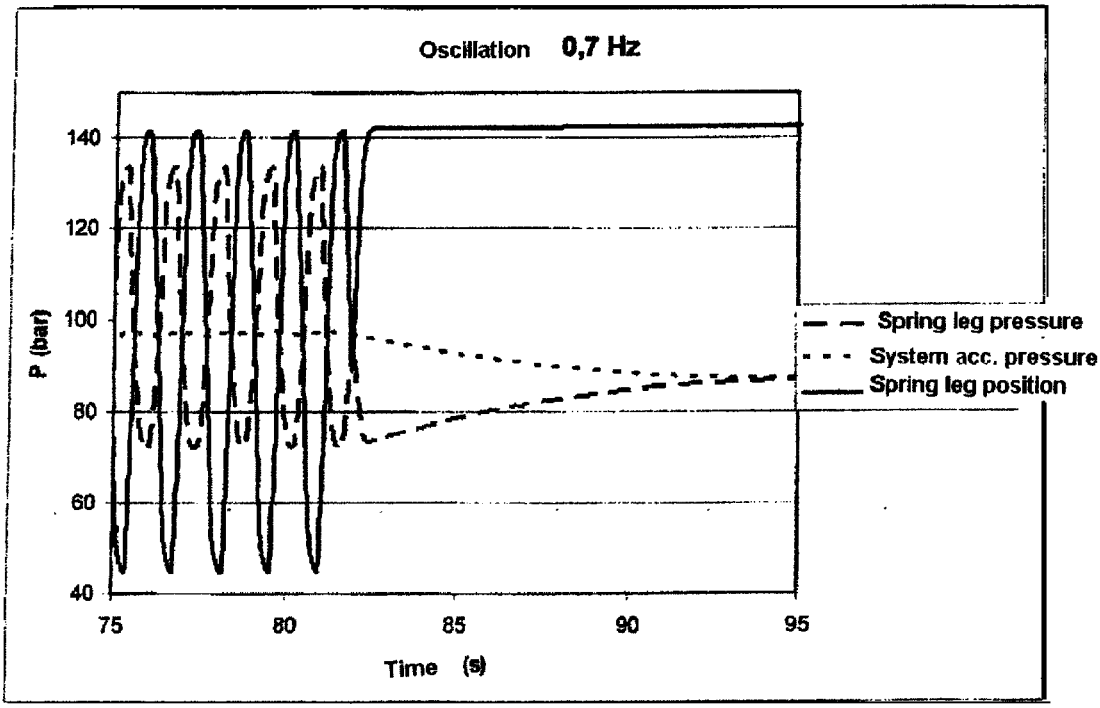

Referring now to the drawings wherein the showings are for the purpose of illustrating a preferred embodiment of the invention only and not for the purpose of limiting same, FIGS. 1-3 illustrate non-limiting embodiments of the suspension system of the present invention.

With reference to FIG. 1, a suspension system is shown which is arranged to act between a wheel 2 or similar bearing against a ground surface 1, for example a roadway, and a vehicle 3. The suspension system comprises a power transmission part 4, which acts between the wheel 2 and the vehicle 3. The power transmission part 4 is connected via a damper unit 5 to a gas spring accumulator 6. The gas spring accumulator is in turn connected to a system accumulator 8 via a pneumatic connection 7. The system accumulator can be connected to a hydraulic system 100 of the vehicle, or to a compressor 110.

The power transmission part 4 can comprise a piston 41, which acts in a space 42 containing hydraulic fluid. The space 42 can be connected to a hydraulic chamber 61 of the gas spring accumulator 6 via one or more hydraulic connections 51, 52.

The hydraulic connections 51, 52 can form part of a damper unit 5 and be provided with respective hydraulic throttle valves 55, 56 with a view to achieving a desired level of damping of the movement of the hydraulic fluid through the connections 51, 52. In addition, the connections can be provided with respective check valves 53, 54, which can be arranged or set such that different damping levels are achieved in the respective motional direction.

The gas spring accumulator 6 can comprise a hydraulic chamber 61, which accommodates a quantity of the hydraulic fluid which can shift via the hydraulic connection 51, 52 between the space 42 and the hydraulic chamber 61. In addition, the gas spring accumulator can comprise a gas chamber 63, which forms the gas cushion which acts as the actual spring in the suspension system. The hydraulic chamber 61 and the gas chamber 63 can be separated by a piston 62, a membrane or the like.

The system accumulator can comprise a system gas chamber 81 and a system hydraulic chamber 83. The system hydraulic chamber 83 and the system gas chamber 81 can be separated by a piston 82, a membrane or the like. The system accumulator 8 can be connected to one, two or more suspension system(s).

The system hydraulic chamber 83 can be connected to a hydraulic system 100 associated with the vehicle.

According to an alternative non-limiting embodiment of the invention, the system gas chamber 81 can be connected to a compressor 110 associated with the vehicle. In this non-limiting embodiment, the system accumulator 8 does not need to comprise any system hydraulic chamber 83 or piston 82.

A gas throttle valve 9 usually has an effective valve area which is less than the area of the pneumatic connection 7.

According to one non-limiting embodiment, the gas throttle valve 9 can be a fixed valve, which is arranged to allow a predetermined flow which is greater than zero. According to one non-limiting embodiment, the gas throttle valve 9 is chosen such that it allows as little flow as possible, given a certain desired level-control speed. Where a fixed gas throttle valve is used, this can be chosen for each given application, for example vehicle type.

According to an alternative non-limiting embodiment, the gas throttle valve 9 can be an adjustable valve, which is arranged to allow at least two different flows which both are greater than zero. An adjustable valve of this kind can be adjustable, insofar as it is set in a position and then remains in this position during use of the system. Alternatively, an adjustable valve of this kind can be adjustable even during use of the system, for example, in response to some external factor, or some vehicle behavior requirement. In order for the throttle valve to be adjustable in this way, both a more advanced throttle valve and a control system are required, however, which adds to the complexity of the system as a whole.

The system shown in FIG. 1 works such that a movement of the wheel 2 as a result of, for example, a bump in the ground surface 1 gives rise to a relative movement between the piston 41 and the power transmission part 4, the hydraulic fluid enclosed in the space 42 being displaced via the hydraulic connection 51, 52 between the space 42 and the hydraulic chamber 61. By virtue of the hydraulic damping valves 55, 56, a damping of the movement is herein achieved.

In the piston 62, the hydraulic fluid acts on the gas chamber 63 such that the volume, and thus the pressure thereof, is changed.

From FIG. 2, it can be seen that the pressure in the spring leg (i.e. the position of the piston 41 in the space 42) varies strongly in response to a change of position of the spring leg. Despite the fact that the connection between the gas chamber 63 and the system gas chamber 81 is open, very little mass flow takes place, however, between the gas chamber 63 and the system gas chamber 81, with the result that the pressure in the system gas chamber 83 is changed very little.

From FIG. 3, it can be seen that if the piston is stopped in, for example, the extended position, it takes about 20 seconds before the pressure is equalized between the gas chamber 63 and the system gas chamber 81.

Level control, i.e. regulation of the ground clearance of the vehicle, can be achieved by increasing the pressure in the system gas chamber 81, or by supplying hydraulic fluid to the space 42 and/or to the hydraulic chamber 61.

Adjustment of the spring constant of the gas spring can be achieved by increasing the pressure in the system gas chamber 81.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

The invention claimed is:

1. A suspension system for a vehicle comprising a power transmission part, a gas spring accumulator and a gas throttle valve, said power transmission part designed to act between a resilient part and an unsprung part of said vehicle, said gas spring accumulator hydraulically connected to said power transmission part via at least two hydraulic channels such that said gas spring accumulator supplies fluid to said power transmission part, said gas spring accumulator in pneumatic connection with a system accumulator such that said system accumulator supplies fluid to said gas spring accumulator, said gas throttle valve arranged to restrict said pneumatic connection between said gas spring accumulator and system accumulator such that a restricted mass flow that is greater than zero flows from said system accumulator to said pneumatic connection, at least one of said hydraulic channels is provided with one or more valves selected from the group consisting of a throttle valve and a check valve.

2. The suspension system as defined in claim 1, wherein said gas throttle valve is selected from the group consisting of 1) a fixed valve that is arranged to allow for a predetermined flow and b) an adjustable valve that is arranged to allow for at least two different flows.

3. The suspension system as defined in claim 2, wherein said gas throttle valve has an effective valve area which is less than said area of said pneumatic connection.

4. The suspension system as defined in claim 1, wherein said gas throttle valve has an effective valve area which is less than said area of said pneumatic connection.

5. The suspension system as defined in claim 1, wherein said system accumulator is designed to interact with a hydraulic system of said vehicle such that a pressure in said system accumulator is at least partially controllable by said hydraulic system.

6. The suspension system as defined in claim 3, wherein said system accumulator is designed to interact with a hydraulic system of said vehicle such that a pressure in said system accumulator is at least partially controllable by said hydraulic system.

7. The suspension system as defined in claim 6, wherein said system accumulator is connected to a compressor such that a pressure in said system accumulator is at least partially controllable by said compressor.

8. The suspension system as defined in claim 7, wherein said power transmission part includes a hydraulic fluid interacting piston.

9. The suspension system as defined in claim 8, wherein pressure in said system accumulator is maintained at a constant level.

10. The suspension system as defined in claim 9, wherein a mean pressure in said system accumulator and said power transmission part is always the same or substantially the same.

11. The suspension system as defined in claim 1, wherein said system accumulator is connected to a compressor such that a pressure in said system accumulator is at least partially controllable by said compressor.

12. The suspension system as defined in claim 1, wherein said power transmission part includes a hydraulic fluid interacting piston.

13. The suspension system as defined in claim 1, wherein pressure in said system accumulator is maintained at a constant level.

14. The suspension system as defined in claim 1, wherein a mean pressure in said system accumulator and said power transmission part is always the same or substantially the same.

15. A method for controlling a suspension system for a vehicle comprising:
   a. providing a suspension system, said suspension system including a power transmission part, a gas spring accumulator and a gas throttle valve, said power transmission part designed to act between a resilient part and an unsprung part of said vehicle, said gas spring accumulator hydraulically connected to said power transmission part via at least two hydraulic channels such that said gas spring accumulator supplies fluid to said power transmission part, said gas spring accumulator in pneumatic connection with a system accumulator such that said system accumulator supplies fluid to said gas spring accumulator, said gas throttle valve arranged to restrict said pneumatic connection between said gas spring accumulator and system accumulator such that a restricted mass flow that is greater than zero flows from said system accumulator to said pneumatic connection, at least one of said hydraulic channels is provided with one or more valves selected from the group consisting of a throttle valve and a check valve; and,
   b. restricting said pneumatic connection between said gas spring accumulator and system accumulator such that a restricted mass flow that is greater than zero flows from said system accumulator to said pneumatic connection to obtain an essentially constant pressure in said system accumulator.

16. The method as defined in claim 15, wherein said gas throttle valve is selected from the group consisting of a) a fixed valve that is arranged to allow for a predetermined flow and b) an adjustable valve that is arranged to allow for at least two different flows.

17. The method as defined in claim 16, wherein said gas throttle valve has an effective valve area which is less than said area of said pneumatic connection.

18. The method as defined in claim 17, including the step of maintaining a pressure in said system accumulator at a constant level.

19. The method as defined in claim 18, including the step of maintaining a mean pressure in said system accumulator and said power transmission part so that such mean pressure are always the same or substantially the same.

20. The method as defined in claim 19, including the step of changing a spring constant of said gas spring accumulator by changing said pressure in said system accumulator.

21. The method as defined in claim 20, wherein said system accumulator is designed to interact with a hydraulic system of said vehicle such that a pressure in said system accumulator is at least partially controllable by said hydraulic system.

22. The method as defined in claim 21, wherein said system accumulator is connected to a compressor such that a pressure in said system accumulator is at least partially controllable by said compressor.

23. The method as defined in claim 15, wherein said gas throttle valve has an effective valve area which is less than said area of said pneumatic connection.

24. The method as defined in claim 15, including the step of maintaining a pressure in said system accumulator at a constant level.

25. The method as defined in claim 15, including the step of maintaining a mean pressure in said system accumulator and said power transmission part so that such mean pressure are always the same or substantially the same.

26. The method as defined in claim 15, including the step of changing a spring constant of said gas spring accumulator by changing said pressure in said system accumulator.

27. The method as defined in claim 15, wherein said system accumulator is designed to interact with a hydraulic system of said vehicle such that a pressure in said system accumulator is at least partially controllable by said hydraulic system.

28. The method as defined in claim 15, wherein said system accumulator is connected to a compressor such that a pressure in said system accumulator is at least partially controllable by said compressor.

* * * * *